May 2, 1967
R. V. GARVER
DIODE LIMITER
Filed April 20, 1964
3,317,860
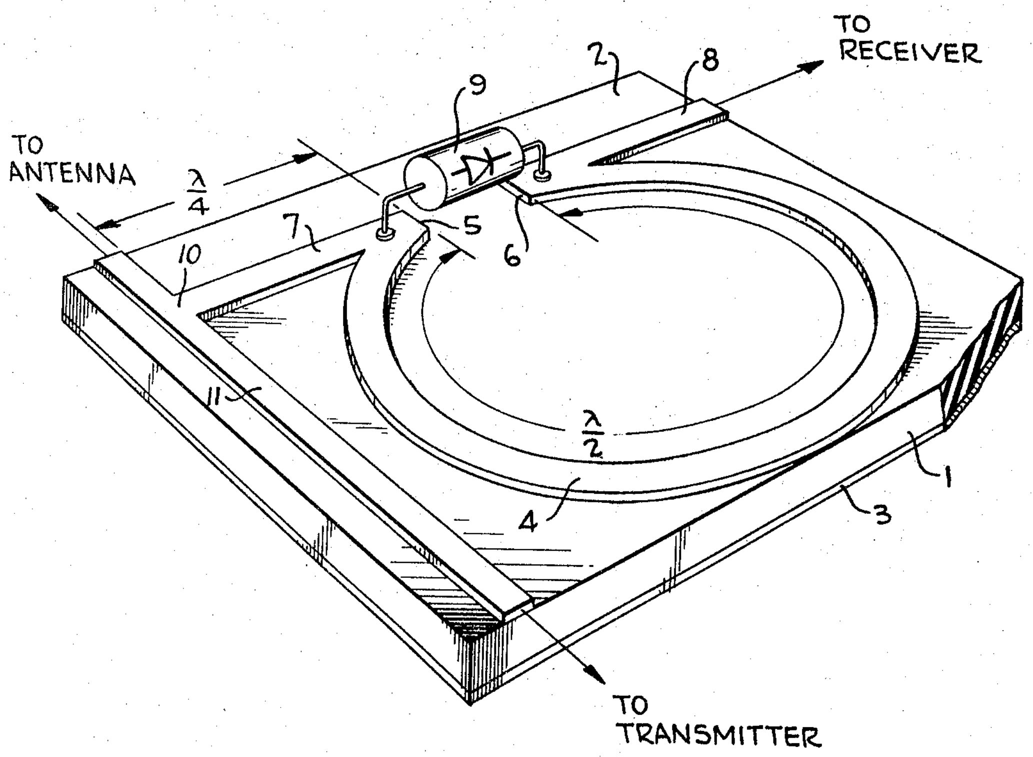
INVENTOR,
ROBERT V. GARVER
BY: Harry M. Saragovitz, Edward J. Kelly, Herbert Berl & J. D. Edgerton 3,317,860
DIODE LIMITER
Robert V. Garver, Rockville, Md., assignor to the United States of America as represented by the Secretary of the Army
Filed Apr. 20, 1964, Ser. No. 361,627
3 Claims. (Cl. 333—13)

The invention described herein may be manufactured and used by or for the Government of the United States of America for governmental purposes without the payment to me of any royalty thereon.

This invention relates generally to diode limiters, and more particularly to a half wavelength loop diode limiter employing microstrip circuitry. The invention finds particular application as a transmit-receive switch in radio-frequency communication systems and radar systems which employ a common antenna for both the transmitter and the receiver.

High frequency limiters and transmit-receive switches in the past have taken the form of wave guides and transmission lines having a plurality of tuning stubs which are either short circuit terminated or open circuit terminated by shunt connected diodes or discharge devices. As a result, these limiters and switches have been difficult and expensive to construct and occupy a relatively large volume.

Accordingly, it is an object of the present invention to provide a diode limiter which is easily manufactured.

Another object of the invention is to provide a diode limiter which is inexpensive to produce.

Still another object of the instant invention is to provide a diode limiter which occupies a small volume.

According to the present invention, the foregoing and other objects are attained by providing a microstrip circuit having an open half wave length loop in series with two striplines and a diode connected between the ends of the open loop and the two striplines. High level signals cause the diode to conduct causing an apparent short circuit in the line thereby preventing the transmission of the signal along the line.

The specific nature of the invention, as well as other objects, aspects, uses and advantages thereof, will clearly appear from the following description and from the accompanying drawing in which the sole figure shows a perspective view of the preferred embodiment of the invention.

Referring now to the drawing wherein there is shown a printed circuit board 1 which comprises any suitable dielectric material having a metallic cladding on two opposite surfaces. One surface 2 is shown as being etched in a particular microstrip configuration. The opposite surface 3 is not etched and constitutes the ground plane for the microstrip circuit. The microstrip circuit comprises an open half wavelength loop 4 having ends 5 and 6, respectively. Because diode 9, as is well known in the art, will in actual practice have a finite electrical length, for the invention to operate as described more fully hereinbelow it will be obvious to those skilled in the art that the electrical length of loop 4 will necessarily have to be made slightly longer so that it will, in fact, be one-half wavelength or an odd multiple thereof longer than the electrical length of diode 9. In actual practice, because of the very small size of the diode used, the actual length of loop 4 will deviate very little from one-half wavelength. Further, as will be apparent to those skilled in the art, the characteristic impedances of diode 9 and loop 4 will have to be substantially the same. When the limiter is used as a transmit-receive switch, stripline 7 is one quarter wavelength long and connected at junction 10 to stripline 11. Stripline 11 is connected at one end to the transmitter and at the other end to the antenna, while stripline 8 is connected to the receiver.

Normally, the diode 9 is nonconducting and presents a very high impedance between ends 5 and 6; therefore, a low power signal on stripline 7 would travel around the half wavelength loop 4 to stripline 8. The signal in traversing the loop 4 between ends 5 and 6 is only very slightly attenuated due to the loss characteristics of the stripline and is shifted in phase by 180°, when the transmitter is turned off which will be the case when the receiver is operating, the transmitter output will normally present a high impedance to any incoming signals, as is well known in the art. For this reason low power signals from the antenna will be directed on to stripline 7 rather than proceeding down stripline 11 to the transmitter. A high power signal on stripline 7 causes diode 9 to conduct thereby providing a low impedance connection between ends 5 and 6. The diode 9 is forced into conduction because the signal at ends 5 and 6 are 180° out of phase. If, for example, the signal at end 5 is 1 volt, the signal at end 6 is −1 volt. When diode 9 is conducting, ends 5 and 6 will have essentially the same potential, and as one travels around loop 4 in either direction equal potentials can be measured at points equidistant from ends 5 and 6 respectively. Upon reaching the halfway point after traveling one-quarter wavelength in either direction a voltage with respect to ground of twice the value of that which appeasr at either end can be measured. This is also the condition which occurs on an open-circuited line. It can therefore be stated that loop 4 behaves as two open circuited quarter-wave lines connected in parallel to ends 5 and 6, respectively. Of course, it will be apparent to those skilled in the art that appropriate modifications to the above analysis will have to be made to compensate for the electrical length introduced by diode 9. Assuming the characteristic impedance of the microstrip circuitry to be $Z_o$, the parallel quarter wavelength stubs may be considered as a single quarter wavelength stub having an impedance of one half $Z_o$. The open circuit terminated quarter wavelength stub presents an apparent short circuit at the ends 5 and 6, thus preventing transmission of the signal to stripline 8. In its application as a transmit-receive switch, the stripline 7 appears as a short circuit terminated quarter wavelength stub connected to stripline 11. The stripline 7, therefore, appears as an open circuit or very high impedance at junction 10, and very little of the signal on stripline 11 is transmitted to stripline 7.

The series connection of the diode 9 in combination with the half wavelength loop 4 has the effect of doubling the voltage drop across the diode as compared to the voltage drop across conventional shunt diode connection thereby reducing the power level at which the diode will conduct by one-fourth. Since the series connected diode is floating with respect to ground, blocking capacitors are no longer needed when bias voltages exist on the striplines.

In summary, it can be seen that there has been provided an inexpensive, easily fabricated yet compact diode limiter which may be used as a transmit-receive switch. It will be apparent that the embodiment shown is only exemplary and that various modifications can be made in construction and arrangement within the scope of the invention as defined in the appended claims.

I claim as my invention:

1. A high frequency diode limiter comprising:
(a) first means for providing an input transmission path for radio frequency energy,
(b) second means for providing an output transmission path for said radio frequency energy,
(c) a diode connected between said first means and said second means for providing a short circuit path between said first means and said second means when said radio frequency energy exceeds a predetermined level, and (d) third means which is bypassed when said diode conducts and is connected between said first and said second means with an electrical length of one-half wavelength or an odd multiple thereof greater than the electrical length of said diode, said third means and said diode having substantially the same characteristic impedances.

2. A transmit-receive switch for high frequency radio energy comprising:

(a) a diode limiter as recited in claim 1, wherein the transmission path provided by said first means is equal to one quarter the wavelength of the radio energy to be transmitted and said second means provides a transmission path to a receiver, and (b) fourth means for providing a transmission path for high frequency radio energy between a transmitter and an antenna and having a junction to which is connected said first means.

3. A radio frequency transmit-receive switch employing a half-wavelength loop diode limiter comprising:

(a) a dielectric board having first and second parallel surfaces, (b) a ground plane attached to said first surface, (c) a first stripline of length equal to one-fourth of wavelength or an odd multiple thereof of the radio frequency energy to be transmitted through it having first and second ends and attached to said second surface, (d) a second stripline having third and fourth ends and attached to said second surface with said second and third ends being in close proximity, and said fourth end being adapted to be connected to a receiver, (e) a diode connected between said second and third ends, (f) a third stripline having fifth and sixth ends and attached to said second surface of a length equal to one-half the wavelength of the radio frequency energy to be transmitted through it longer than the electrical length introduced by said diode with said fifth and sixth ends being connected to said second and third ends, respectively, said third stripline and said diode having substantially the same characteristic impedances, and (g) a fourth stripline having seventh and eighth ends and attached to said second surface with said seventh and eighth ends being adapted to be connected to a transmitter and antenna, respectively, said fourth stripline further having a junction between said seventh and eighth ends to which is connected said first end.

References Cited by the Examiner

UNITED STATES PATENTS

| | | | |
|---|---|---|---|
| 2,410,641 | 11/1946 | Evans. | |
| 2,498,719 | 2/1950 | Spencer | 333—13 X |
| 3,131,367 | 4/1964 | Pitts et al. | 333—7 X |

HERMAN KARL SAALBACH, *Primary Examiner.*

ELI LIEBERMAN, *Examiner.*

P. L. GENSLER, *Assistant Examiner.*